Dec. 14, 1965 L. THORINGTON 3,223,273
REINFORCED ENVELOPE FOR LIGHT SOURCE AND METHOD OF MAKING
Filed Sept. 7, 1962

INVENTOR
LUKE THORINGTON
BY Darby & Darby
ATTORNEYS

United States Patent Office 3,223,273
Patented Dec. 14, 1965

3,223,273
REINFORCED ENVELOPE FOR LIGHT SOURCE
AND METHOD OF MAKING
Luke Thorington, Berkeley Heights, N.J., assignor to
Duro-Test Corporation, North Bergen, N.J., a corporation of New York
Filed Sept. 7, 1962, Ser. No. 221,954
17 Claims. (Cl. 220—2.1)

This invention is related to improvements in light transmitting envelopes and enclosures for light sources constructed to have superior mechanical and thermal shock resistance without substantially modifying the optical characteristics of the light source.

The invention broadly consists in the combination with a light transmitting envelope or enclosure for a light source of a wrapped light transmitting covering therefor adhesively bound thereto by means of an adhesive which is in optical contact with the yarn comprising said covering.

A more specific object of the invention is to provide a protective covering for a light transmitting envelope made of a frangible material subject to breakage and shattering under mechanical or thermal shock or both which is adhered thereto by means of an adhesive which is itself light transmitting and has substantially the same index of refraction as the material of the envelope.

Another more specific object of the invention is to provide, in combination, a glass envelope such as the envelope for an incandescent lamp, or a globe or chimney for a light source to the surface of which, preferably the exterior, there has been applied a covering of light transmitting yarn in the form of a single layer wrapping, a knitted or woven sleeve, or a knitted or woven tape adhesively bonded thereto by means of an adhesive which wets the yarn and/or penetrates the bundle of yarns in the case of multi-filaments to establish optical contact therewith.

More specifically still it is an object of this invention to apply a protective covering to a frangible enclosure of the types referred to composed of fiber glass yarns either mono-filament or multi-filament.

Other and more detailed objects of the invention will be apparent from the following disclosure of the several embodiments thereof illustrated in the attached drawings, including the methods of producing them as hereinafter disclosed.

For the purposes of disclosure the invention has been disclosed as a combination including an incandescent lamp having a glass envelope. It is to be understood, however, that the invention is equally useful for other types of light transmitting enclosures such as globes and chimneys for light sources of any type.

Figure 1:
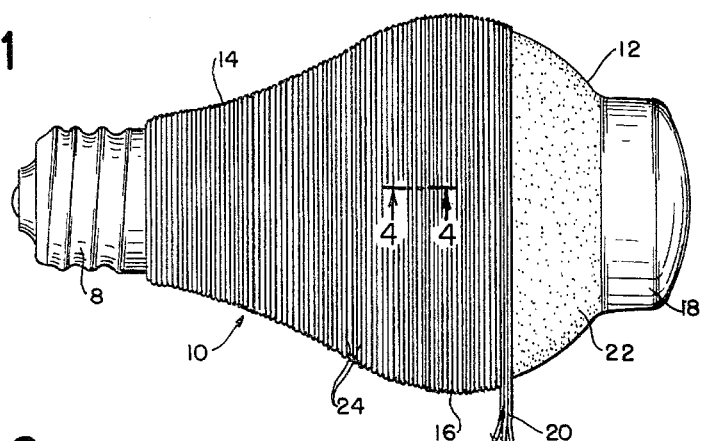
FIGURE 1 is a side view of an incandescent lamp partially completed by the application thereto of a single layer of light transmitting yarn applied in parallel contiguous convolution.

As shown in FIGURE 1, the incandescent lamp 10, used for illustrative purposes, includes a glass enclosure 12 to which is attached at one end a screw base 8. The enclosure 12 consists of an outwardly flaring neck portion 14 continuing into a generally spherical portion 16 and terminating in a dome 18 comprising a cylindrical wall capped by a curved wall. It will be understood by those skilled in the art as the disclosure proceeds that the combination of this invention is not limited to this particular form of glass enclosure. The glass enclosure 12 of the illustrated form as is usual with incandescent lamps forms a hermetically sealed housing for the filament and other related parts not shown.

The surface of the enclosure 12 by one method of manufacture is coated in any suitable manner with a light transmitting adhesive 22 onto which is wound, while the coating is still tacky, a single layer of protective covering consisting of a plurality of parallel contiguous convolutions 24. These convolutions are formed, for example, by rotating the incandescent lamp on its longitudinal axis and wrapping thereon one or more light transmitting yarns 20 each of which can be a mono-filament or a multi-filament yarn. The yarns may be made of various commercially available plastic materials but are preferably made of fiber glass which is less likely to change in color at the operating temperatures normally to be encountered in an incandescent lamp.

FIGURE 1 illustrates the process of wrapping the yarn onto the surface of the enclosure and normally the wrapping would continue either to the base of the dome 18 or to the end of its cylindrical surface.

The wrapped lamp is then subjected to a curing procedure, the details of which are determined by the nature of the adhesive employed. There are a number of light transmitting and yarn wetting adhesives which are suitable for the purpose and the details of the curing procedure are naturally determined by the physical and chemical properties of the adhesive. In accordance with the invention the purpose of curing the adhesive, as is well understood in the art, is to change the properties of the plastic or resin of the adhesive by chemical reaction which, depending upon the nature of the adhesive, may occur by condensation, polymerization or vulcanization. Such curing is accomplished either by heat or catalysts alone or in combination with or without the application of pressure.

It is desirable in order to produce a durable commercial product to treat the yarn preferably by heating it to clean, that is, free it, from all foreign materials that may adhere thereto including the sizing commonly applied thereto in its manufacture. This cleaning is for the purpose of preventing darkening of the material adhering to the yarn which might otherwise occur at elevated operating temperatures in the presence of light. For example, the cop, pirn or spool on which the yarn is supplied is heated in a convection oven at a temperature of approximately 650° F. for approximately 48 hours after which it is removed and allowed to cool to room temperature. This treatment will remove surface contamination and particularly the starch binder which is applied as an incident to the manufacture of the yarn.

Before the yarn 20 is applied to the surface of the lamp bulb, it is treated with a material which acts as a coupling agent to bond the adhesive resin to the glass of the envelope and the fiber glass yarn. Materials suitable to this purpose have a reactive component that attaches to the glass and another reactive component that attaches to the resinous adhesive thereby forming the desired bond. Among the materials that can be used is a monomeric silane having the formula

Another suitable material is a solution containing 40% t-butanol, 40% t-amyl alcohol and 20% of the reaction product of one mol $C_{18}H_{37}SiCl_3$ with three mols of 2-dimethylaminoethanol having the formula

$HOCH_2CH_2NMe_2$

This reaction product is known to be a hydrochloride salt which is believed to have the formula

$C_{18}H_{37}Si(OCH_2CH_2NMe_2 \cdot HCl)_3$

Those skilled in the art consonant with the objects of this invention will understand that other suitable coupling agents are commercially available.

The coating 22 applied to the envelope 12 by dipping, spraying, brushing or the like is a curable adhesive resin such as SR–119, a product of General Electric Company and resins designated as 2103, 2104, 2105–A and 2106 commercially available products of Dow Corning Corporation. All of these resins are phenyl or methyl polysiloxenes or mixtures thereof. They have the desired light transmitting qualities which are well maintained at the operating temperatures of an incandescent lamp. They react with the coupling agents which are used to coat or impregnate the yarn.

When the adhesive resin is applied in the form of the coating 22 to the envelope the yarn 20 has applied to it as, for example, by running it through a bath thereof either of the coupling agents referred to above. As an alternative, the yarn 20 can first be run through a bath of the coupling agent and then through a bath of the penetrating adhesive resin whereupon it is wrapped, as previously described, onto the surface of the envelope 12.

When the envelope is completely wrapped the lamp is placed in the curing oven, as previously described, to effect a curing of the adhesive resin.

Figure 4:
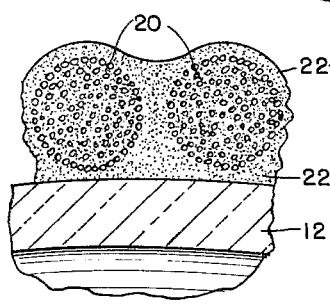
FIGURE 4 is a greatly enlarged cross-sectional view of the structure of FIGURE 1 taken on the line 4—4 of that figure.

FIGURE 4 is an attempt to diagrammatically illustrate the structure involved wherein a portion of the glass envelope 12 is shown in cross-section. On the surface thereof is the coating 22 of adhesive resin in which, in the case illustrated, the multi-filament yarns 20 are embedded. The coating 22 thus bonds the yarn to the glass after curing to form a strong protection for the glass envelope. It can be demonstrated that this protective covering imparts greatly increased resistance of the glass envelope to mechanical and thermal shock. Furthermore, in the event that the shock is sufficient to break the envelope the pieces are so strongly bonded to the fiber glass wrapping that the product is substantially shockproof, that is, no bits are freed to cause possible damage.

At this point it may be noted that when desired, when the lamp is completely wrapped with yarn, it may be dipped in or sprayed with the same adhesive resin used to coat the envelope 12 thereby forming a thin layer of resin 22a about the yarn convolutions to further strengthen the entire structure. Likewise, it is noted that the alternative method of passing the yarn through successive baths of coupling agent and adhesive resins produces the same resultant assembly. In either case the assembly will have the appearance shown in cross-section in FIGURE 4.

The net result of these procedures is to produce an assembly which is a highly efficient light transmitter which provides an enclosure for a light source. The use of a resin which penetrates the yarn bundle also contributes to the fact that the wrapping of glass fibers does not diffract or refract the light as would be the case in the absence of the penetrating or wetting resin, see for example applicant's Patent No. 2,963,612, issued December 6, 1960. In the assembly of that patent a penetrating resin is not employed and the fiber glass wrapping produces a novel optical effect as a result of the refraction and diffraction of the light by the glass fibers of the glass-air interfaces. These phenomena do not occur in the product herein disclosed since the resin is in optical contact with the fiber glass and has about the same index of refraction.

It is within the purview of this invention to form the fiber glass or equivalent yarn covering in other ways. For example, the yarn 20 could be wrapped about the envelope 12 in a crisscross pattern instead of parallel convolutions to increase the strength of the product.

Figure 2:
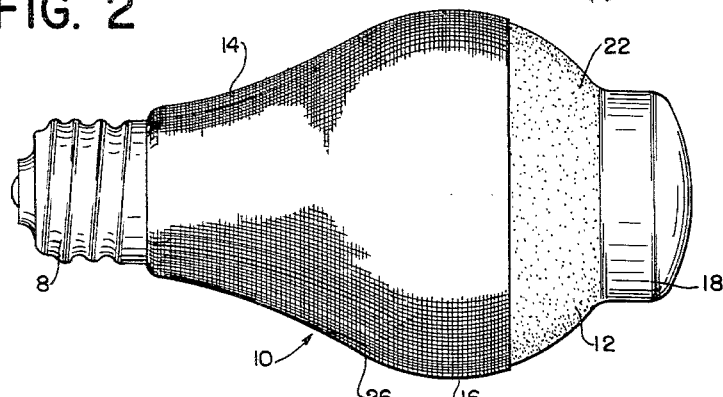
FIGURE 2 is a similar view of a modified assembly wherein the protective coating consists of a shaped sleeve of knitted or woven light transmitting yarn adhesively bound to the envelope of the lamp.

As illustrated in FIGURE 2, the covering 26 could be in the form of a fabric, either knit or woven, of suitable light transmitting yarn either of plastic or fiber glass. Pieces of this fabric could be bonded to the envelope 12 after it has been provided with the adhesive resin coating 22 as previously described. In this case the fabric would be impregnated with the wetting agent or the alternative procedure could be used first impregnating it with the wetting agent and then applying the penetrating adhesive resin thereto whereupon the whole is adhered to the envelope 12. As an alternative the fabric cover 26 could be knit or woven in the form of a sleeve which could be forced onto the envelope.

Figure 3:
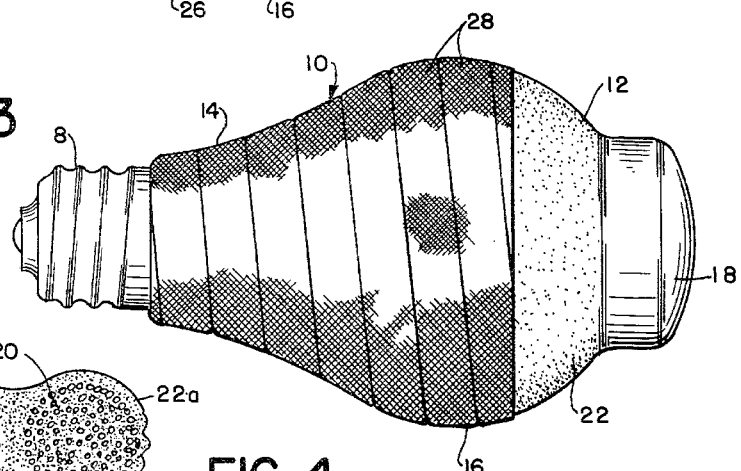
FIGURE 3 is a similar view of another modification in which the protective covering is composed of a layer of wrapped tape knitted or woven of light transmitting yarn.

Having in mind all the variations of procedure mentioned above it is also possible to apply a protective cover 28 to the envelope 12 in the form of a tape as shown in FIGURE 3. This tape either knit or woven of suitable yarn could be applied as shown in the form of a spiral wrapping.

In the case of the forms of the invention in FIGURES 2 and 3 the coverings 26 and 28 respectively can be terminated short of the end of the envelope 12 as shown or could continue to the termination of the spherical portion 16 or to the end of the cylindrical portion of the dome 18.

It is also proposed, in accordance with this invention, to use adhesive resins which are colored and/or used as well as colored yarns. As is well understood, there are various relatively efficient light transmitting resins and yarns in various colors which would be suitable for covering light transmitting envelopes.

It is apparent from the above disclosure that the subject matter of this invention is capable of considerable variation in the forms of the product thereof and in the procedures for making it. It is desired, therefore, that the disclosure be taken in an illustrative sense and the scope of the invention determined by the appended claims.

What is claimed is:

1. A mechanical and thermal shock-resistant light transmitting enclosure for a light source comprising a light transmitting glass envelope, a covering of light transmitting yarn on the surface of said envelope and a light transmitting adhesive including a yarn wetting agent and a bonding resin binding said covering to said envelope.

2. In the combination of claim 1, said envelope comprising an evacuated enclosure for an electric lamp.

3. In the combination of claim 1, said envelope comprising an evacuated enclosure for an incandescent lamp.

4. In the combination of claim 1, said yarn being fiber glass.

5. In the combination of claim 1, said covering consisting of a wrapped layer of said yarn.

6. In the combination of claim 1, said covering comprising a fabric formed of said light transmitting yarn.

7. In the combination of claim 1, said covering comprising a fabric knit of said light transmitting yarn.

8. In the combination of claim 1, said covering comprising a fabric woven of said light transmitting yarn.

9. In the combination of claim 1, said covering being coated with a light transmitting resin.

10. In the combination of claim 1, said agent being a monomeric silane.

11. In the combination of claim 1, said agent comprising a solution of a volatile solvent and the reaction product of $F_{18}H_{37}SiCl_3$ and 2-dimethylaminoethanol.

12. An electric light source including an evacuated glass envelope, a continuous surface covering of light transmitting yarn on said envelope, and an adhesive resin having substantially the same index of refraction as said envelope and forming a resin-to-glass bond between said yarn and envelope.

13. In the combination of claim 12, said yarn being glass fiber.

14. A method of forming a light transmitting enclosure which comprises coating the glass enclosure with a light transmitting adhesive, impregnating a light transmitting yarn with a wetting resin, applying the yarn to said coating to form a covering for said enclosure and curing said resin.

15. A method of forming a light transmitting glass enclosure comprising coating a light transmitting yarn first with a coupling agent and then with an adhesive resin, applying the yarn to said enclosure and curing said resin.

16. In the method of claim 14, said curing being effected by baking.

17. In the method of claim 15, said curing being effected by baking.

References Cited by the Examiner

UNITED STATES PATENTS

| Re. 25,017 | 8/1961 | Cooper. | |
| 1,062,565 | 5/1913 | French | 215—12 |
| 3,057,505 | 10/1962 | Chapman et al. | 220—2.1 |

FOREIGN PATENTS

| 1,057,330 | 10/1953 | France. |
| 342,289 | 12/1959 | Switzerland. |

THERON E. CONDON, *Primary Examiner.*

M. L. RICE, *Assistant Examiner.*